(12) United States Patent
Hadderman et al.

(10) Patent No.: US 9,053,223 B2
(45) Date of Patent: *Jun. 9, 2015

(54) MODULAR REFRIGERATION UNIT HEALTH MONITORING

(75) Inventors: Scott Hadderman, Pleasant Valley, NY (US); Timothy R. Marchini, Hyde Park, NY (US); K. Paul Muller, Wappingers Falls, NY (US); Katie L. Pizzolato, Austin, TX (US); Andrew H. Vogel, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 616 days.

This patent is subject to a terminal disclaimer.

(21) Appl. No.: 13/355,063

(22) Filed: Jan. 20, 2012

(65) Prior Publication Data
US 2013/0191072 A1   Jul. 25, 2013

(51) Int. Cl.
*G21C 17/00* (2006.01)
*G06F 15/00* (2006.01)
(Continued)

(52) U.S. Cl.
CPC ........ *G06F 11/3476* (2013.01); *G06F 11/3058* (2013.01)

(58) Field of Classification Search
CPC ..... B23P 15/26; G06F 1/20; G06F 2200/201; H05K 7/20836; H05K 7/20772; H05K 7/2029; H05K 7/20254; H05K 7/20272; H05K 7/20318; H05K 7/20; H05K 7/20236; H05K 7/20663; H05K 7/20718; H05K 7/2079; H05K 7/20818; H05K 7/202; H05K 7/20281; H05K 7/20609; H05K 7/20754; H05K 7/00; H05K 7/203; H05K 7/20336; H05K 7/20745; H05K 7/20809; H05K 13/00; H05K 7/2039; H05K 7/20763; H05K 7/208; H05K 7/20827; H05K 7/20936; F28F 27/00; F28F 9/00; F28F 3/00; F28F 17/005; F28F 1/126; F28F 1/32; F28F 27/02; F28F 1/00; F28D 15/00; F28D 1/0471; F28D 1/0475; F28D 1/05366; F28D 2021/0038; F28D 1/02; F28D 15/02; F28D 1/04; F25B 49/02; F25B 21/02; F25B 2400/01; F25B 39/028; F25B 49/00; F25B 49/005; F25B 13/00; F25B 17/083; F25B 2313/006; F25B 2313/0233; F25B 2313/02741; F25B 43/00; F25B 43/003; F25B 49/022; F25B 49/04; F25B 49/046; F25B 9/00; F25B 9/006; F25B 2400/04; F25B 2500/06; F25B 2500/22; F25B 2600/2501; F25B 29/003; F25B 39/02; F25B 41/043
USPC ........................................................ 702/182
See application file for complete search history.

(56) References Cited

U.S. PATENT DOCUMENTS 7,016,742 B2 *   3/2006   Jarrell et al. .................... 700/28
7,292,677 B2    11/2007   Beamon
(Continued)

FOREIGN PATENT DOCUMENTS

JP     2010088893 A1    4/2010
JP     2010114701 A1    5/2010

OTHER PUBLICATIONS

Grimmelius, et. al., "On-line failure diagnosis for compression refrigeration plants", International Journal of Refrigeration 18 (1995) pp. 31-41.*

(Continued)

*Primary Examiner* — Mohamed Charioui
*Assistant Examiner* — Seokjin Kim
(74) *Attorney, Agent, or Firm* — Cantor Colburn LLP; Margeret McNamara

(57) ABSTRACT

A method for modular refrigeration unit (MRU) health monitoring includes receiving log data on a log data input from the MRU by a MRU health monitor, the log data comprising a plurality of datapoints, each of the plurality of datapoints comprising a position of a control valve of the MRU and a corresponding time; determining by the MRU health monitor a plurality of MRU parameters from the log data; determining a plurality of MRU health flags based on the MRU parameters; adding the plurality of MRU health flags to determine an MRU health score; determining whether the MRU health score is higher than a replacement threshold; and indicating replacement of the MRU in the event the MRU health score is higher than the replacement threshold.

16 Claims, 4 Drawing Sheets

(51) Int. Cl.
*G06F 11/34* (2006.01)
*G06F 11/30* (2006.01)

(56) References Cited

U.S. PATENT DOCUMENTS

| | | | |
|---|---|---|---|
| 8,185,246 B2* | 5/2012 | Josserand et al. | 700/278 |
| 2004/0186927 A1 | 9/2004 | Eryurek et al. | |
| 2006/0282362 A1 | 12/2006 | Nasr et al. | |
| 2008/0141072 A1 | 6/2008 | Kalgren et al. | |
| 2008/0312783 A1* | 12/2008 | Mansouri et al. | 701/29 |
| 2009/0204232 A1 | 8/2009 | Guru et al. | |
| 2010/0114810 A1* | 5/2010 | Hoyte et al. | 706/47 |
| 2010/0306001 A1 | 12/2010 | Discenzo et al. | |
| 2010/0309244 A1* | 12/2010 | Yamada | 347/17 |
| 2011/0111920 A1* | 5/2011 | Gooden et al. | 477/98 |
| 2013/0128918 A1* | 5/2013 | Campbell et al. | 374/57 |

OTHER PUBLICATIONS

Jardine, et. al., "A review on machinery diagnostics and prognostics implementing condition-based maintenance", Elsevier Mechanical Systems and Signal Processing, Nov. 3, 2005, pp. 1483-1510.*
Schmidt, et. al., "High-end server low-temperature cooling", IBM Journal of Research and Development, vl. 46, No. 6, Nov. 2002, pp. 739-751.*
R. Schmidt, et. al. "High-end server low-temperature cooling", IBM Journal of Research and Development, vol. 46, No. 6, Nov. 2002, pp. 739-751.*
Grimmelius, et. al. "On-line failure diagnosis for compression refrigeration plants," International Journal of Refrigeration 18 (1995) pp. 31-41.*
A. Jardine, et al., "A Review on Machinery Diagnostics and Prognostics Implementing Condition-Based Maintenance," Elsevier Mechanical Systems and Signal Processing 20 (2006); Nov. 3, 2005; pp. 1483-1510.

* cited by examiner

MODULAR REFRIGERATION UNIT HEALTH MONITORING

BACKGROUND

This disclosure relates generally to the field of modular refrigeration units (MRUs) for use in conjunction with mainframe computers or servers, and more particularly to health monitoring of a MRU during operation.

The power dissipation of integrated circuit chips, and the modules containing the chips, continues to increase in order to achieve increases in computer processor performance. This trend poses a cooling challenge at both the module and system level. Increased air flow rates are needed to effectively cool high power modules and to limit the temperature of the air that is exhausted into a data center, as overheated computer equipment may cease to function properly. In many larger server applications, processors along with their associated electronics (e.g., memory, disk drives, power supplies, etc.) are packaged within a rack or frame. Heat that is produced by the computer components of the server rack or frame may stress the operation of the server. This is especially true for large installations such as server farms or large banks of computer racks close together. In such installations, MRUs may be used to cool individual servers in the server room. An MRU is a refrigeration unit that is built into a server to cool computer components that are internal to the server. An MRU may include one or two active refrigeration loops. An MRU is a critical component to server operations, which may be heavily disrupted in the event of MRU failure. Failure of an MRU may lead to stress in the server containing the MRU, and possibly other servers in the installation due to heat buildup in the installation.

As an MRU ages, the cooling capability of the MRU may be reduced. In order to compensate for reduced cooling capability in an MRU, the MRU may enter an overtemperature recovery (OTR) mode. An MRU maintains the temperature in the vicinity of the component that is being cooled by the MRU (referred to as $T_{HAT}$) at a particular desired temperature. However, if $T_{HAT}$ is over the desired temperature for an extended period of time during operation, the MRU enters into OTR mode, in which the flow of coolant in the MRU is automatically increased by a set amount in order to lower $T_{HAT}$. However, MRUs may have a relatively high fail rate while operating in the OTR regime, and addressing reduced cooling capability of an MRU automatically with an OTR is not always successful. If that is the case, the MRU fails and needs to be replaced. Such an MRU failure may be disruptive to operation of the server containing the MRU.

BRIEF SUMMARY

In one aspect, a method for modular refrigeration unit (MRU) health monitoring includes receiving log data from the MRU on a log data input by a MRU health monitor, the log data comprising a plurality of datapoints, each of the plurality of datapoints comprising a position of a control valve of the MRU and a corresponding time; determining by the MRU health monitor a plurality of MRU parameters from the log data; determining a plurality of MRU health flags based on the MRU parameters; adding the plurality of MRU health flags to determine an MRU health score; determining whether the MRU health score is higher than a replacement threshold; and indicating replacement of the MRU in the event the MRU health score is higher than the replacement threshold.

In another aspect, a computer program product includes a computer readable storage medium containing computer code that, when executed by a computer, implements a method for modular refrigeration unit (MRU) health monitoring, wherein the method includes receiving log data from an MRU, the log data comprising a plurality of datapoints, each of the plurality of datapoints comprising a position of a control valve of the MRU and a corresponding time; determining a plurality of MRU parameters from the log data; determining a plurality of MRU health flags based on the MRU parameters; adding the plurality of MRU health flags to determine an MRU health score; determining whether the MRU health score is higher than a replacement threshold; and indicating replacement of the MRU in the event the MRU health score is higher than the replacement threshold.

In yet another aspect, a modular refrigeration unit (MRU) health monitor includes a log data input configured to receive log data from an MRU, the log data comprising a plurality of datapoints, each of the plurality of datapoints comprising a position of a control valve of the MRU and a corresponding time; and MRU health monitoring logic configured to determine a plurality of MRU parameters from log data received on the log data input; determine a plurality of MRU health flags based on the MRU parameters; add the plurality of MRU health flags to determine an MRU health score; determine whether the MRU health score is higher than a replacement threshold; and indicate replacement of the MRU in the event the MRU health score is higher than the replacement threshold.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
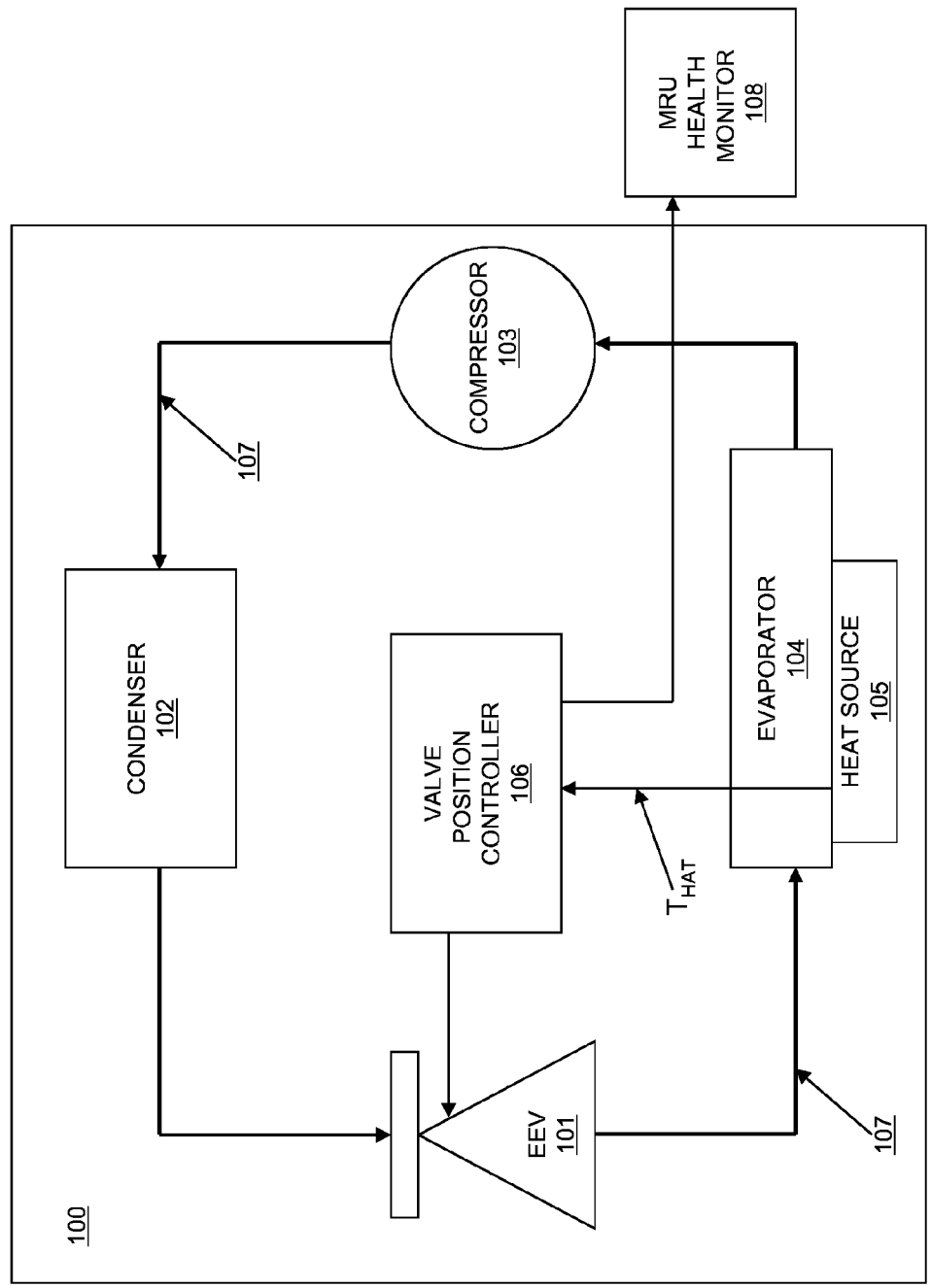
FIG. 1 is a schematic block diagram illustrating an embodiment of an MRU and a MRU health monitor.

Embodiments of systems and methods for MRU health monitoring are provided, with exemplary embodiments being discussed below in detail. Monitoring an MRU during operation allows prediction of MRU failure in advance. Predicting MRU failure allows disruption of server operations to be reduced by proactive replacement of the MRU during scheduled downtime. The performance of the MRU is monitored based on data that is collected in logs from the MRU during operation. By monitoring the log data over time, instability in the MRU is tracked so that replacement may be recommended within an appropriate timeframe, avoiding premature replacement, which adds cost to the operation of the server containing the MRU, while also avoiding unanticipated MRU failure, which may cause disruption in server operation.

The log data that is collected from an MRU gives information regarding the position of the control valve (also referred to as an electronic expansion valve, or EEV) in the MRU and $T_{HAT}$ over time. The EEV modulates the flow of coolant in the MRU. The more open the EEV is, the more coolant flows in the system. $T_{HAT}$, which is the temperature in a hat that is located over the server component (for example, one or more processors) that is cooled by the MRU, is maintained within a specific operating range by adjusting the position of the EEV. The position of the EEV may be described in units referred to as steps. A fully closed EEV is at zero steps, while in some embodiments a fully opened EEV may be at 3000 steps, and the normal operating range for the EEV may be between 50 steps and 500 steps.

The log data also indicates the occurrence of OTR and undertemperature recovery (UTR) events during the operation of the MRU. In an OTR event, the EEV position may be automatically increased by a set amount, for example 200 steps, to lower $T_{HAT}$ to within the desired operating range. After $T_{HAT}$ is back in the desired operating range, the OTR event ends, and the EEV position may then be decreased by the set amount to the regular position. An OTR event may be triggered by $T_{HAT}$ exceeding the desired operating range by a specified amount for a specified time period (e.g., a time/temperature integral of, for example, 300° C.*second). The MRU may also have an undertemperature recovery (UTR) mode, which occurs if $T_{HAT}$ is below the specified operating range by a specific amount for a specified period of time. In a UTR event, the MRU may automatically decrease the EEV position by a set amount, for example 200 steps, until $T_{HAT}$ is in the desired operating range. The occurrence of OTR and UTR events indicate that the ability of the EEV to maintain $T_{HAT}$ are limited due to, for example, build up of residuals in the EEV. The MRU health monitor may analyze OTR and UTR events as well as other EEV position data in the MRU logs to make an assessment of MRU health, allowing predictive maintenance of the MRU to be scheduled as needed. In some embodiments, the log data may be periodically transmitted from a customer site, which may comprise a server farm, through a network, which may comprise telephone or internet connection, to a maintenance location including the MRU health monitor. The transmission may occur once a week in some embodiments.

FIG. 1 is a schematic block diagram showing an embodiment of an MRU 100 and a MRU health monitor 108. The MRU 100 may be located internally to a server, and includes a single refrigeration loop including EEV 101 (also referred to as a control valve), a condenser 102, a compressor 103, and an evaporator 104, which are connected by coolant lines 107. A heat source 105 is cooled by the evaporator 104. The heat source 105 may be any internal module of a server, including but not limited to the server processor. The valve position controller 106 changes the position of EEV 101 based on $T_{HAT}$, which is the temperature in a hat that is located over the heat source 105. The valve position controller 106 adjusts the position of the EEV 101 in order to maintain $T_{HAT}$ in a desired operating range. In some embodiments, there is not a sensor for determining the position of the EEV 101 in the EEV 101. The position of the EEV 101 may be expressed in steps, which refers to the degree of openness of the EEV 101, as discussed above. To lower $T_{HAT}$, the number of steps of the valve position of EEV 101 is raised by valve position controller 106, thereby increasing the flow of coolant in coolant lines 107; to raise $T_{HAT}$, the number of steps of the valve position of EEV 101 is lowered by valve position controller 106, thereby decreasing the flow of coolant in coolant lines 107.

Data from the valve position controller 106 regarding $T_{HAT}$ and the position of the EEV 101 over time is collected and stored in a log. Data points indicating the position of the EEV 101 and the time may be collected at any appropriate interval. MRU health monitor 108 may comprise a computer. In various embodiments, the log data may be directly gathered by the MRU health monitor 108, or may be collected by a computer storage device located locally to the valve position controller 106. The log data also includes data regarding OTR and UTR events, which occur if $T_{HAT}$ is over or under the desired operating range by a specified amount for a specified period of time. This log data is received by the MRU health monitor 108 on a log data input for analysis. The MRU health monitor 108 may be positioned in any appropriate location with respect to the MRU 100; for example, in some embodiments the MRU health monitor 108 may be in a remote location. In some embodiments, the MRU 100 is located at a customer site, and the log data may be periodically transmitted from the customer site, which may comprise a server farm, through a network, which may comprise telephone or internet connection, to a maintenance location including the MRU health monitor 108. The transmission of the log data to the MRU may occur at any appropriate interval; the interval may be once a week in some embodiments.

Figure 2:
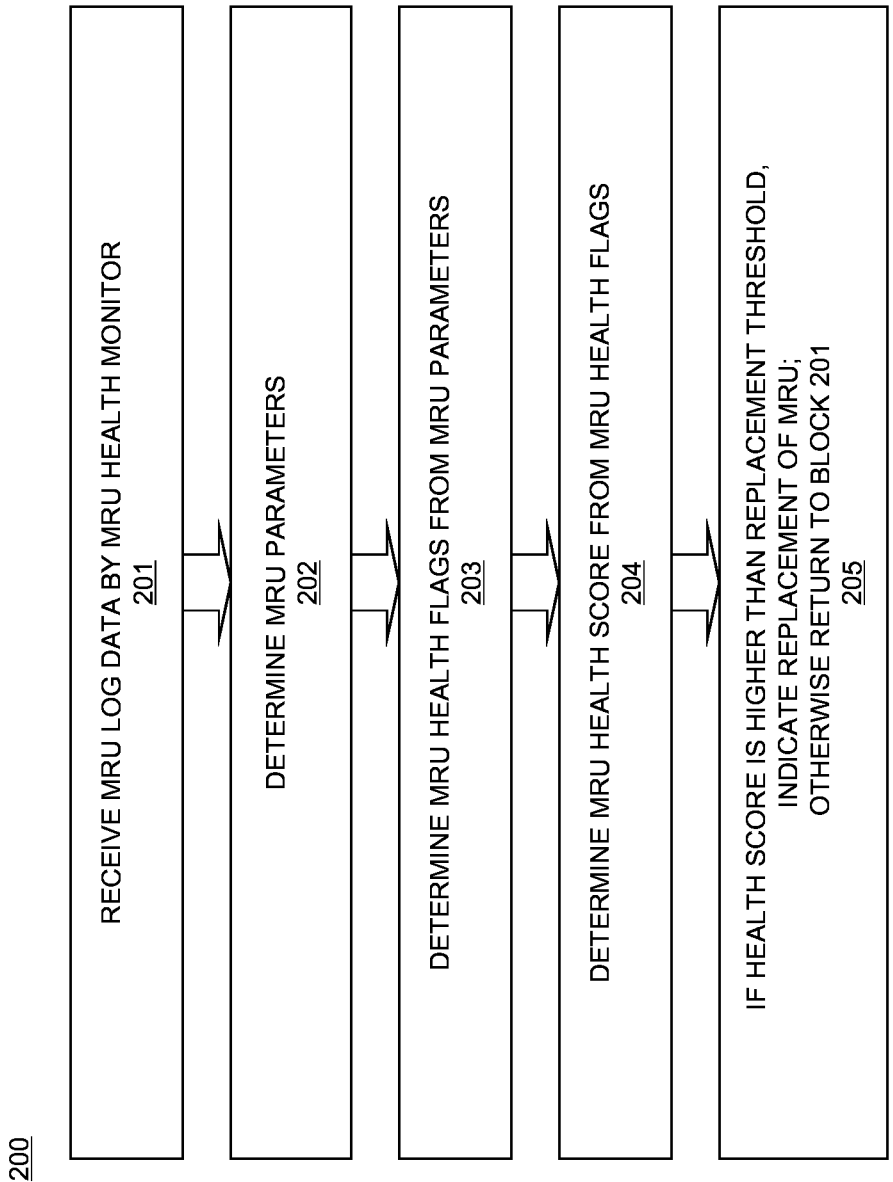
FIG. 2 is a flowchart illustrating an embodiment of a method for MRU health monitoring.

FIG. 2 illustrates an embodiment of a flowchart of a method 200 for MRU health monitoring. Method 200 is implemented in MRU health monitor 108, and is discussed with respect to FIG. 1. First, in block 201, the MRU health monitor 108 receives log data that was collected from the valve position controller 106 during operation of the MRU 100. In some embodiments, the log data may be collected by a computer storage device located locally to the valve position controller 106 and transmitted periodically (for example, once a week) to the MRU health monitor 108. Each log transmission may include any appropriate number of data points, which may each comprise a valve position, a $T_{HAT}$ value, and a time, in addition to data regarding the occurrence of OTR and UTR events during the operation of MRU 100.

Then, in block 202, a set of MRU parameters are determined by the MRU health monitor 108 from the log data that was received from the MRU 100 in block 201. The MRU parameters are determined by directly analyzing the log data. The range of time and amount of data covered by the log data is determined by determining MinDate, which is the earliest time for which a valve position data point is received; MaxDate, which is the most recent time for which a valve position data point is received, and NumData, which is a count of the number of unique data points in the received log data. Other MRU parameters include MinXPS, which is the lowest EEV position in the log data, and which may have a floor in some embodiments; MaxXPS, which is the highest EEV position in the log data; AvgXPS, which is the average EEV position over the log data; MinOTR, which is the lowest number of over temperature recoveries (OTR) observed per specified unit of time (for example, per day), in the log data; MaxOTR, which is the highest number of OTRs observed per specified unit of time (for example, per day), in the log data; MinUTR, which is the lowest number of UTRs observed per specified unit of time (for example, per day), in the log data; MaxUTR, which is the highest number of UTRs observed per specified unit of time (for example, per day), in the log data); $T_{HAT}$Min, which is the lowest $T_{HAT}$ in the log data; and $T_{HAT}$Max, which is the highest $T_{HAT}$ in the log data. The above MRU parameters may be taken directly from the log data. From the above-listed MRU parameters, further MRU parameters are calculated. NumDays gives the amount of time covered by the log data, and is given by MaxDate−MinDate. XPSRate is the average EEV position change per unit time across the log data, and is given by (MaxXPS−MinXPS)/NumDays. OTRRate is the daily rate at which the OTR value climbs (assuming the OTR rate was not reset during the NumDays period), and is given by (MaxOTR−MinOTR)/NumDays.

Figure 3:
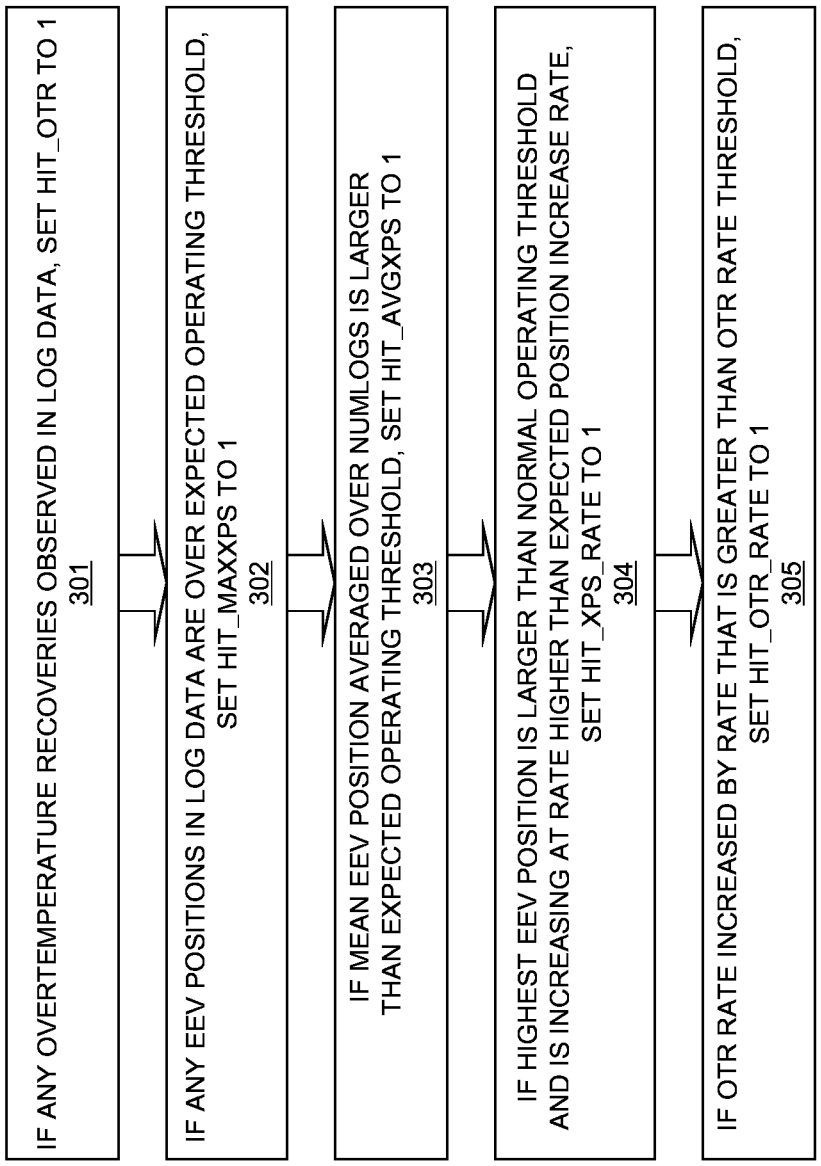
FIG. 3 is a flowchart illustrating an embodiment of a method for determination of MRU health flags.

Returning to method 200 of FIG. 2, after the MRU parameters are determined by MRU health monitor 108 in block 202, flow proceeds to block 203, in which MRU health flags are determined based on the MRU parameters by the MRU health monitor 108. The MRU health flags may comprise 5 values: HIT_OTR, HIT_MAXXPS, HIT_AVGXPS, HIT_XPS_RATE, and HIT_OTR_RATE. Each of these 5 values may comprise a flag that has a value of zero or one. Determination of these MRU health flags in block 203 of FIG. 2 is illustrated in further detail in FIG. 3, which is a flowchart illustrating a method 300 of determining the MRU health flags. First, in block 301 of method 300, HIT_OTR, which comprises an OTR flag that indicates if any OTR events were seen in the log data, is set. HIT_OTR is determined based on if either or both of MinOTR or MaxOTR are greater than zero. Therefore, if any OTR events are seen in the log data, then HIT_OTR is set to one by MRU health monitor 108; otherwise, HIT_OTR is set to zero.

Next, in block 302, HIT_MAXXPS is determined. HIT_MAXXPS comprises an expected operating threshold flag that indicates if the EEV position went above an expected operating threshold at any point in the log data, and is therefore set to one if MaxXPS (which was determined in block 202) is greater than the expected operating threshold, and is otherwise set to zero. The expected operating threshold is a threshold EEV position over which the MRU 100 is assumed to have reduced cooling capability. The expected operating threshold may be any appropriate value for the particular MRU 100 that is under analysis (about 250 steps in some embodiments).

Flow then proceeds to block 303, in which HIT_AVGXPS is determined. HIT_AVGXPS comprises a control valve position average flag that indicates if the average EEV position was higher than the expected operating threshold over the log data. HIT_AVGXPS may be set to one if AvgXPS (which was determined in block 202) is greater than the expected operating threshold (discussed above with respect to block 302). HIT_AVGXPS also takes into account whether NumData (which was also determined in block 202) is greater than a datapoint averaging minimum; otherwise, HIT_AVGXPS is set to zero. The datapoint averaging minimum is a minimum amount of data that needs to be evaluated to make an accurate assessment of HIT_AVGXPS, and may correspond to about 5 weeks worth of data in some embodiments.

Next, in block 304, HIT_XPS_RATE is determined. HIT_XPS_RATE comprises a control valve position increase flag that indicates if the EEV position is larger than a normal operating threshold, and if the EEV position is observed to be increasing at a rate that is greater than an expected position increase rate. Therefore, HIT_XPS_RATE may be set to one if XPSRate (which was determined in block 202 of FIG. 2) is greater than an expected position increase rate threshold, and if MaxXPS (which was determined in block 202 of FIG. 2) is greater than a normal operating threshold; otherwise, HIT_XPS_RATE may be set to zero. Additionally, HIT_XPS_RATE may take into account whether NumData (which was determined in block 202 of FIG. 2) is greater than the datapoint averaging minimum (discussed above with respect to block 303), and whether NumDays (which was determined in block 202 of FIG. 2) is greater than a time averaging period minimum, in order to ensure that sufficient log data is available to accurately determine HIT_XPS_RATE. The expected position increase rate threshold is a maximum rate at which the EEV position may increase over time over which the MRU 100 is assumed to have reduced cooling capability, and may be 1 in some embodiments. The normal operating threshold is a threshold EEV position that the EEV 101 is typically below during normal operation of MRU 100. The normal operating threshold is lower than the expected operating threshold (discussed above with respect to blocks 302 and 303), and may be about 180 steps in some embodiments. The averaging time period minimum is an amount of time over which data needs to be collected to make an accurate assessment of HIT_XPS_RATE, and may be about 1 day in some embodiments.

Lastly, in block 305 of method 300, HIT_OTR_RATE is determined. HIT_OTR_RATE comprises an OTR rate flag that indicates if the number of OTRs counted in the log data per unit of time is increasing at an unacceptable rate. Therefore, if OTRRate (which was determined in block 202 of FIG. 2) is greater than an OTR rate threshold, then HIT_OTR_RATE is set one; otherwise, HIT_OTR_RATE is set to zero. The OTR rate threshold may correspond to an increase in the number of OTRs of 1 per week in some embodiments.

Returning now to method 200 of FIG. 2, flow now proceeds to block 204, in which the MRU health flags calculated in block 204 are combined by the MRU health monitor 108 to determine a health score for the MRU 100. In some embodiments, this may be performed by counting the number of 1's that are set in the flags, i.e., the health score equals the sum of HIT_OTR, HIT_MAXPS, HIT_XPS_RATE, HIT_AVGXPS, and HIT_OTR_RATE. In other embodiments, the MRU health flags may be assigned different weights, as the type of events indicated by one MRU health flag may be a stronger indication of imminent MRU failure than another MRU health flag. For example, HIT_OTR_RATE may be weighted more heavily than HIT_OTR, which may be weighted more heavily than HIT_AVGXPS, which may be weighted more heavily than HIT_XPS_RATE, which may be weighted more heavily than HIT_MAXXPS. Some example weighting factors that may be used are 1 for HIT_MAXXPS; 1.5 for HIT_XPS_RATE; 2.5 for HIT_AVGXPS; 3 for HIT_OTR; and 5 for HIT_OTR_RATE, in which case the health score equals HIT_MAXXPS+1.5*HIT_XPS_RATE+2.5*HIT_AVGXPS+3*HIT_OTR+5*HIT_OTR_RATE. These weighting factors are shown for illustrative purposes only, and may be adjusted as appropriate in various embodiments.

Lastly, in block 205 of method 200, the health score that was calculated in block 205 is compared to a replacement threshold. If the health score is determined to be higher than the replacement threshold by the MRU health monitor 108, the MRU health monitor 108 indicates that the MRU 100 needs replacement. Replacement of MRU 100 may be scheduled based on the indication of the MRU health monitor 108. The replacement threshold may be about 3 in some embodiments; however, this is given for illustrative purposes only, and may be adjusted as appropriate (based on, for example, the weighting factors assigned to the various flags in block 204) in various embodiments. Additionally, in embodiments in which an MRU includes two active refrigeration loops, the scores for the two loops may be combined to determine whether replacement should occur. The replacement of the MRU 100 may occur during scheduled downtime, reducing disruption to the operation of the server and the server farm in which the MRU is located.

Figure 4:
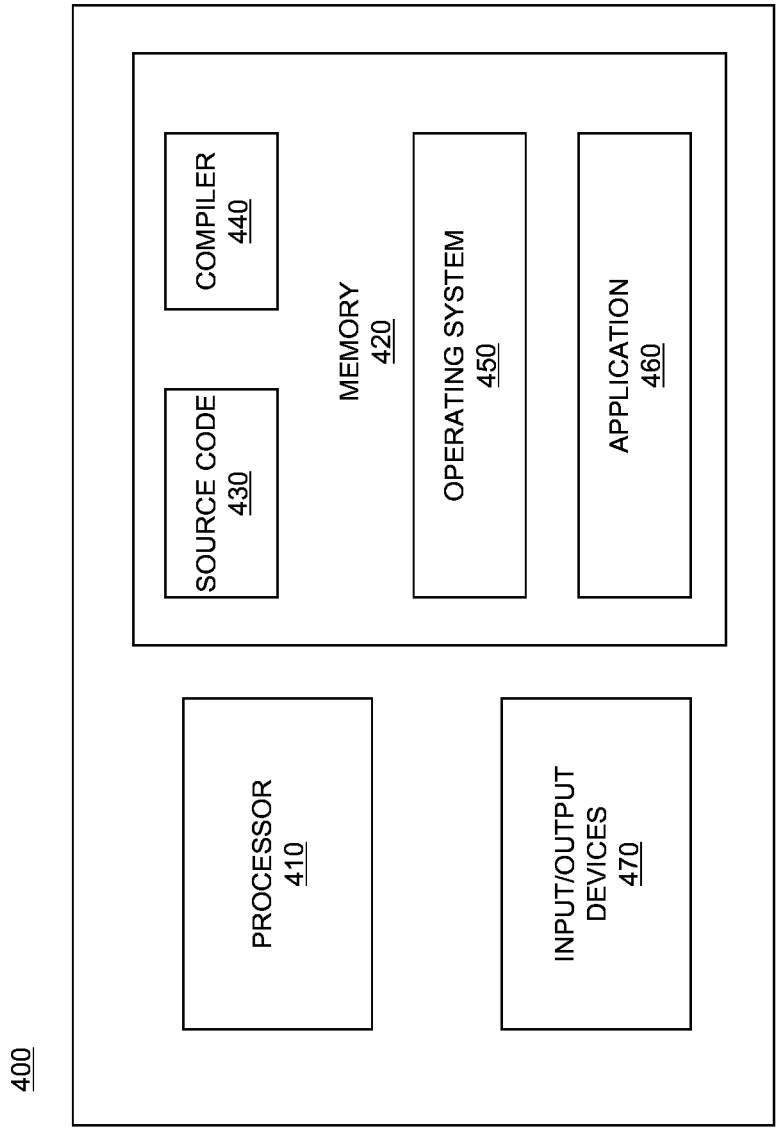
FIG. 4 is a schematic block diagram illustrating an embodiment of a computer that may be used in conjunction with systems and methods for MRU health monitoring.

FIG. 4 illustrates an example of a computer 400 which may be utilized by exemplary embodiments of a method for MRU health monitoring as embodied in software. Various operations discussed above may utilize the capabilities of the computer 400. One or more of the capabilities of the computer 400 may be incorporated in any element, module, application, and/or component, for example the MRU health monitor 108, discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include determination of an appropriate timeframe for MRU replacement, avoiding premature replacement while also avoiding unanticipated MRU failure.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for modular refrigeration unit (MRU) health monitoring, the method comprising:
    receiving log data from the MRU on a log data input by a MRU health monitor, the log data comprising a plurality of datapoints, each of the plurality of datapoints comprising a position of a control valve of the MRU and a corresponding time;
    determining by the MRU health monitor a plurality of MRU parameters from the log data;
    determining a plurality of MRU health flags based on the MRU parameters;
    adding the plurality of MRU health flags to determine an MRU health score;
    determining whether the MRU health score is higher than a replacement threshold; and
    indicating replacement of the MRU in the event the MRU health score is higher than the replacement threshold, wherein the plurality of MRU health flags comprises an overtemperature recovery (OTR) rate flag, a control valve position increase flag, control valve position average flag, an expected operating threshold flag, and an OTR flag, and wherein each of the MRU health flags is set to one of zero and one based on the log data.

2. The method of claim 1, further comprising scheduling a replacement of the MRU in the event replacement of the MRU is indicated.

3. The method of claim 1, wherein the OTR flag is set to one in the event that at least one OTR event is observed in the log data.

4. The method of claim 1, wherein the expected operating threshold flag is set to one in the event that a highest control valve position in the log data is higher than an expected operating threshold of the MRU.

5. The method of claim 1, wherein the control valve position average flag is set to one in the event that an average control valve position over the log data is determined to be higher than an expected operating threshold of the MRU.

6. The method of claim 1, wherein the control valve position increase rate flag is set to one in the event that an average control valve position increase per unit time across the log data is determined to be higher than an expected position increase threshold and a highest control valve position in the log data is higher than a normal operating threshold of the MRU, wherein the normal operating threshold of the MRU is lower than an expected operating threshold of the MRU.

7. The method of claim 1, wherein the OTR rate flag is set to one in the event that a rate of increase of a number of OTRs per unit time observed in the log data is higher than an OTR rate threshold.

8. The method of claim 1, wherein adding the plurality of MRU health flags to determine an MRU health score comprises multiplying each of the MRU health flags by a weighting factor and adding the weighted MRU health flags, wherein the OTR rate flag has a weighting factor that is higher than a weighting factor of the control valve position increase flag, the control valve position increase flag has a weighting factor that is higher than a weighting factor of the control valve position average flag, the control valve position average flag has a weighting factor that is higher than a weighting factor of the expected operating threshold flag, and the expected operating threshold flag has a weighting factor that is higher than a weighting factor of the OTR flag.

9. A computer program product comprising a non-transitory computer readable storage medium containing computer code that, when executed by a computer, implements a method for modular refrigeration unit (MRU) health monitoring, wherein the method comprises:
    receiving log data from an MRU, the log data comprising a plurality of datapoints, each of the plurality of datapoints comprising a position of a control valve of the MRU and a corresponding time;
    determining by a plurality of MRU parameters from the log data;
    determining a plurality of MRU health flags based on the MRU parameters;
    adding the plurality of MRU health flags to determine an MRU health score;
    determining whether the MRU health score is higher than a replacement threshold; and
    indicating replacement of the MRU in the event the MRU health score is higher than the replacement threshold, wherein the plurality of MRU health flags comprises an overtemperature recovery (OTR) rate flag, a control valve position increase flag, control valve position average flag, an expected operating threshold flag, and an OTR flag, and wherein each of the MRU health flags is set to one of zero and one based on the log data.

10. The computer program product according to claim 9, further comprising scheduling a replacement of the MRU in the event replacement of the MRU is indicated.

11. The computer program product according to claim 9, wherein the OTR flag is set to one in the event that at least one OTR event is observed in the log data.

12. The computer program product according to claim 9, wherein the expected operating threshold flag is set to one in the event that a highest control valve position in the log data is higher than an expected operating threshold of the MRU.

13. The computer program product according to claim 9, wherein the control valve position average flag is set to one in the event that an average control valve position over the log data is determined to be higher than an expected operating threshold of the MRU.

14. The computer program product according to claim 9, wherein the control valve position increase rate flag is set to one in the event that an average control valve position increase per unit time across the log data is determined to be higher than an expected position increase threshold and a highest control valve position in the log data is higher than a normal operating threshold of the MRU, wherein the normal operating threshold of the MRU is lower than an expected operating threshold of the MRU.

15. The computer program product according to claim 9, wherein the OTR rate flag is set to one in the event that a rate of increase of a number of OTRs per unit time observed in the log data is higher than an OTR rate threshold.

16. The computer program product according to claim 9, wherein adding the plurality of MRU health flags to determine an MRU health score comprises multiplying each of the MRU health flags by a weighting factor and adding the weighted MRU health flags, wherein the OTR rate flag has a weighting factor that is higher than a weighting factor of the control valve position increase flag, the control valve position increase flag has a weighting factor that is higher than a weighting factor of the control valve position average flag, the control valve position average flag has a weighting factor that is higher than a weighting factor of the expected operating threshold flag, and the expected operating threshold flag has a weighting factor that is higher than a weighting factor of the OTR flag.

* * * * *